Patented Feb. 16, 1937

2,070,739

UNITED STATES PATENT OFFICE 2,070,739

VAT DYESTUFF PREPARATION IN POWDER FORM ESPECIALLY SUITABLE FOR PRINTING

Carl Krauss and Max Pommer, Frankfort-on-the-Main-Fechenheim, Germany, assignors to General Aniline Works, Inc., New York, N. Y., a corporation of Delaware No Drawing. Application June 26, 1933, Serial No. 677,764. In Germany July 23, 1932

8 Claims. (Cl. 8—6)

Our present invention relates to new vat dyestuff preparations in powder form especially suitable for printing and a process of making the same.

In the domestic and foreign patent literature many methods are described for improving dyestuff pastes for the use in printing processes by adding thereto solutions of certain dispersing and wetting agents and the like.

The manufacture of dyestuff preparations in powder form which are equal to the said pastes of the same dyestuffs as to degree of fineness and capacity of being wetted and fixed was hitherto unknown. Dyestuffs in such powder form are of great technical interest since they show the distinct advantage over pastes of not being susceptible to settling, drying up, and freezing. Moreover, owing to their higher concentration, the costs of packing, storing, and shipping are substantially lower.

Now we have found that new vat dyestuff preparations in powder form especially suitable for printing are obtainable by intimately mixing finely divided pastes which may have been sieved or milled, of the dyestuffs or their leuco compounds, respectively with solutions of such additions the favorable effect of which has been proved in the manufacture of vat dyestuff preparations in the paste form and by rapidly drying such mixtures by spraying them and causing a current of heated air or other gases to come in contact with the spray.

As suitable additions which are mixed with the dyestuff pastes before drying may be named the solutions of wetting and dispersing agents and particularly of accelerators of the fixation, which additions are adapted to enhance the printing qualities of the dyestuff to a marked degree.

The present new preparations in powder form which in some cases may be milled once more, are substantially superior for printing purposes yet without having been previously reduced to dried preparations containing the same ingredients, but prepared in the usual manner by milling the components together in the dry state. At least the new preparations are equal to the pastes of the same dyestuffs or their leuco-compounds, respectively, which contain the same additions in corresponding quantities.

The special value of the present preparations probably is due to the fact that the components have been mixed in dissolved form and a degree of homogeneity is obtained, which is impossible to obtain when only milling the components in the dry state. Surprisingly the high degree of homogeneity remains entirely unchanged after the above described process of drying the mixtures has been completed.

From the fact that the dispersing and wetting agents when added in solution to a dyestuff paste yield the known valuable results in printing processes, it could not be concluded that the powders obtained according to the present process retain the valuable properties of the moist mixtures produced by the above additions to the dyestuff pastes, because it could not be foreseen that during the drying process the homogeneity of said additions and the dyestuffs in the moist dyestuff paste would be retained in the powders.

Protective colloids such as dextrine or molasses, which have been cited in literature as stabilizers for leuco-compounds are unsuitable for the present preparations.

In order to further illustrate our invention the following examples are given the parts being by weight; but we wish it, however, to be understood that our invention is not limited to the particular products nor reacting conditions mentioned therein.

Example 1

100 parts of 6.6'-dichloro-4.4'-dimethylthioindigo in the form of an aqueous suspension which may have been sieved previously and which contains about 20% of the dyestuff are intimately mixed with a concentrated aqueous solution of 15 parts of the sodium salt of benzylsulfanilic or of dimethylsulfanilic or naphthalene-α-sulfonic acid which may have been purified by filtration and the mixture is dried by spraying it in a current of heated air. The powder thus obtained is equally well suitable for printing processes as a finely divided paste.

Example 2

100 parts of 6.6'-dichloro-4.4'-dimethylthioindigo in the form of an aqueous suspension of about 20% strength are well mixed with concentrated aqueous, eventually filtered solutions of 15 parts of the sodium salt of benzylsulfanilic acid, of 10 parts of crystallized iron sulfate or of another heavy metal salt such as stannous chloride and of a wetting agent of the well known type of the aliphatic or aromatic series, for instance, of the sulfuric acid ester of oleic acid ethylanilide and the mixture is dried as described in Example 1. It is even without previous reduction suitable for printing as well as the corresponding paste.

Example 3

100 parts of 6.6'-diethoxy-thioindigo are intimately mixed with a solution of 10 parts of benzylsulfanilic sodium and a solution of 1 part of iron sulfate and the mixture is dried by spraying it in a current of hot air. It is likewise suitable for printing processes even without previous reduction as in the case of the corresponding paste.

*Example 4*

100 parts of the leuco compound of 5.5'-dichloro-4.4'-7.7'-tetramethylthioindigo are mixed with a solution of 15 parts of the sodium salt of benzylsulfanilic acid, dried by spraying it in a current of hot air and subsequently milled once more. The preparation is suitable for printing processes as well as the corresponding paste.

*Example 5*

100 parts of dibromo-anthanthrone (cf. U. S. Patent 1,877,315) in the form of a finely divided aqueous paste of about 20% strength are intimately mixed with concentrated aqueous solutions of 15 parts of the sodium salt of benzylsulfanilic acid and of 10 parts of iron sulfate and dried as described in the foregoing example. The preparation is at least equal with the corresponding paste as to the use for printing processes.

In the following claims we include leuco compounds of vat dyestuffs under the term "vat dyestuffs".

We claim:

1. Printing preparations in powder form consisting of a mixture of a vat dyestuff, addition agents capable of wetting and dispersing the dyestuff to such a degree as to enhance its printing qualities, and a fixation accelerator, said mixture being obtained by intimately mixing a finely divided paste of the dyestuff with aqueous solutions of said additions and drying the mixture rapidly by spraying it and causing a current of a heated gas to come in contact with the spray.

2. Printing preparations in powder form consisting of a mixture of a vat dyestuff of the thioindigo series, addition agents capable of wetting and dispersing the said dyestuff to such a degree as to enhance its printing qualities, and a fixation accelerator, said mixture being obtained by intimately mixing a finely divided paste of the dyestuff with aqueous solutions of said additions and drying the mixture rapidly by spraying it and causing a current of heated gas to come in contact with the spray.

3. Printing preparations in powder form consisting of a mixture of a vat dyestuff and addition agents capable of wetting and dispersing the dyestuff to such a degree as to enhance its printing qualities, said mixture being obtained by intimately mixing a finely divided paste of the dyestuff with aqueous solutions of said additions and drying the mixture rapidly by spraying it and causing a current of heated gas to come in contact with the spray.

4. Printing preparations in powder form consisting of a mixture of a vat dyestuff of the thioindigo series and addition agents capable of wetting and dispersing the dyestuff to such a degree as to enhance its printing qualities, said mixture being obtained by intimately mixing a finely divided paste of the dyestuff with aqueous solutions of said additions and drying the mixture rapidly by spraying it and causing a current of heated gas to come in contact with the spray.

5. A printing preparation consisting of 6.6'-dichloro-4.4'-dimethylthioindigo, the sodium salt of benzylsulfanilic acid, iron sulfate, and as a wetting agent a sulfuric acid ester of oleic acid ethylanilide, said mixture being obtained by intimately mixing a finely divided paste of the dyestuff with aqueous solutions of the said additions and rapidly drying the mixture by spraying it and causing a current of heated gas to come in contact with the spray.

6. A printing preparation consisting of 6.6'-dichloro-4.4'-dimethylthioindigo, the sodium salt of benzylsulfanilic acid, and iron sulfate, said mixture being obtained by intimately mixing a finely divided paste of the dyestuff with aqueous solutions of the said additions and rapidly drying the mixture by spraying it and causing a current of heated gas to come in contact with the spray.

7. A printing preparation consisting of 6.6'-diethoxythioindigo and the sodium salt of benzylsulfanilic acid, said mixture being obtained by intimately mixing a finely divided paste of the dyestuff with aqueous solutions of said addition and drying the mixture rapidly by spraying it and causing a current of a heated gas to come in contact with the spray.

8. A printing preparation consisting of the leuco compound of 5.5'-dichloro-4.4'-7.7'-tetramethylthioindigo and the sodium salt of benzylsulfanilic acid, said mixture being obtained by intimately mixing a finely divided paste of the dyestuff with an aqueous solution of the said addition and drying the mixture rapidly by spraying it and causing a current of a heated gas to come in contact with the spray.

CARL KRAUSS.
MAX POMMER.